Patented July 31, 1934

1,968,795

UNITED STATES PATENT OFFICE 1,968,795

WETTING AGENT

Heinrich Bertsch, Chemnitz, Germany, assignor, by mesne assignments, to American Hyalsol Corporation, Wilmington, Del., a corporation of Delaware No Drawing. Application April 30, 1930, Serial No. 448,806. In Germany June 17, 1929

21 Claims. (Cl. 252—1)

My invention relates to improvements in moistening, permeating, foaming and dispersing media, and in the process of manufacturing the same.

In my application for patent filed July 29, 1929, Ser. No. 382,078, of which the present application is a continuation in part, I have described the use of sulphation or sulphonation products of the alcohols corresponding to the higher molecular acids of the fatty and oleic acid series as moistening, permeating, foaming and dispersing media, the said products being described as possessing superior properties to sulfonated carboxylic acid compounds particularly due to the absence of any free or esterifiable carboxyl groups.

The specification of my prior application reads as follows:

"The sulphonation products of fats, oils and their carboxylic acids have good emulsifying and wetting properties on account of which said products are used, in the form of Turkey red oils and other kindred preparations as emulsifiers, wetting and impregnating agents and the like.

"The principal object of the present invention is to provide a class of preparations of the same type, but with far superior properties. According to the invention such preparations can be obtained by using alcohols corresponding to the higher fatty and oily acids in the form of their sulphonation products.

"These preparations can be referred to as sulphuric esters of alcohols derived from higher fatty acids and oily acids by replacement of the carboxylic groups by the $CH_2OH$ groups.

"The following compounds are examples of substances found highly satisfactory:

$CH_3.(CH_2)_{10}.CH_2OSO_3H$—
Sulfuric ester of lauric alcohol $CH_3.(CH_2)_7.CH=CH-(CH_2)_7CH_2OSO_3H$—
Sulfuric ester of oleic alcohol $CH_3.(CH_2)_{14}.CH_2OSO_3H$—
Sulfuric ester of cetyl alcohol $CH_3.(CH_2)_{16}.CH_2OSO_3H$—
Sulfuric ester of stearic alcohol "These sulphonation products, apart from their powers of resistance due to the absence of any free or esterifiable carboxyl group, have high wetting, foaming, emulsifying and cleaning properties, and also the power of imparting a soft-smooth but not sticky feel to textile fibres and analogous materials. They are therefore not only capable of manifold application in the textile and leather industries but are also adapted for use in other spheres.

"Thus in all forms of treatment of textiles with neutral, acid, or alkali treatment liquids, said products enhance the action by the material increased wetting and impregnation achieved and by the conversion of fats, impurities and the like into aqueous suspensions.

"In vat dyeing the addition of such products enables the reduction to be performed in the presence of little, or weak, alkali, which is important in the dyeing of vat dyestuffs on animal fibres. In naphthol red dyeing it is in this manner possible to dye even on animal fibres if desired. Addition of the substances above referred to also facilitates the moistening or wetting of pulverulent dyestuffs and other powders for their conversion into aqueous liquids, for the production of pastes and so forth. For spinning purposes, their aqueous dispersions with or without further additions have proved to be valuable moistening agents. Similarly the action of treatment liquids in the manufacture and handling of leather is accelerated, strengthened and advantageously modified by the addition of the sulphonated fatty alcohols.

"Said compounds are also capable of being used with advantage in the paper manufacture and treating industry, in the manufacture of pigment colours, in the dyeing of furs wherever it is a question of the wetting effect, dispersion and conveyance of effective substances of components. The properties of said products also allow of their use in pharmacy as emulsifiers, in the pharmaceutical industry as foaming agents and skin-protective media and also as constituents of salves and creams, as a substitute for vasenols and the like.

"It is a characteristic feature of said products that they render textile fibres and other materials treated therewith soft and pliable without giving the same a sticky feel so that they are suitable for the softening or reviving of such materials.

"Their efficacy as agents in the extermination of pests depends upon the same powers of active wetting and penetration. The products are also valuable as additions to corrosives and as boring oils in the metal treating industry. Furthermore, they may be employed as dispersives of the nature of protective colloids, for instance in the manufacture of ink and in fat cleavage. Their penetrating powers are of advantage when they are used as additions to ceramic masses and their rapidly effective wetting powers make them useful as dust-binding agents.

"The substances with which the sulphuric esters herein described are to be used are dependent for their effectiveness upon two properties. The first is their ultimate power for accomplishing the desired result, and the second, their power to quickly, easily or thoroughly penetrate into the material being treated. It is with this second property that the instant invention is particularly concerned. The sulphuric esters disclosed herein have the property of enhancing the penetrating and dispersing power of the treating substances whether they be wetting, foaming, emulsifying or other agent above disclosed.

"The esters do, however, in many cases have additional beneficial effects upon the material treated as hereinbefore described.

"The alcohols corresponding to the higher fatty and oily acid series may be referred to collectively as the 'higher fatty alcohols'. In the appended claims 'a higher fatty alcohol' is employed to refer to any one of these alcohols.

"This application is a continuation in part of applicant's copending application Serial No. 350,135, filed March 26, 1929."

I have discovered that also the sulphation or sulphonation products hereinafter referred to as sulphuric derivatives, of other higher molecular aliphatic alcohols with one or more hydroxyl groups may be used for the same purpose. The sulphuric derivatives of polyhydroxy alcohols, or their alkali, calcium or magnesium salts are even more readily soluble than the derivatives of the corresponding monohydroxy alcohols, which may be explained by the fact that the polyhydroxy alcohols are able to take up more sulfuric acid residues.

In the manufacture of these sulphuric derivatives I start for example from alcohols obtained by reduction from the esters of higher molecular hydroxyacids. Thus a dihydroxy alcohol is obtained.

*Example.*—A sulphuric derivative from such an alcohol is obtained as follows: 286 kilogrammes of octadecan-diol 1,12 which may be obtained by known methods by reduction of 12-oxystearic acid is treated with 232 kilogrammes of chlorosulfonic acid at 30° C. The raw product is directly neutralized with soda lye and the inorganic components such as sodium sulfate and sodium chloride are separated. By vaporization the product is obtained free of water.

It may be pointed out that a sulphuric acid ester of an aliphatic compound such as is contemplated in this application may have the following formula:

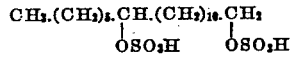

The sulphuric derivatives of the higher aliphatic alcohols are readily soluble in water, and they have high moistening and foaming properties, and they may be used alone or in mixture with other components in the manner and for the purposes described in the aforesaid application for patent.

Further, I have discovered that these derivatives of the higher monohydroxy and polyhydroxy alcohols of the aliphatic series described in the said application have a very favorable influence on acid fulling. Ordinarily the acid fulling of wool such as is usual in the manufacture of felts and hats is carried out by exposing the fabric or wool fleece with little moisture and in the presence of sulfuric acid, acetic acid, lactic acid or formic acid to rubbing movement by jamming or pressing tools. It has also been proposed to add tanning, alkylated, aromatic or hydroaromatic sulfonic acids, or sulfonic acids, of aliphatic hydrocarbons such as are obtained f. i. from brown coal tar oil to the acid fulling liquors.

The sulfonated and sulfated higher molecular alcohols of the aliphatic series described above and in the said application for patent are superior to the said known additions in their efficiency. Thus for example for these purposes a product is very suitable which is obtained by the action of fuming sulphuric acid or chlorosulfonic acid, if desired, in the presence of organic or inorganic acid anhydrides or acid chlorides on dodecyl or octodecyl alcohol. Further, sulfuric acid esters of higher aliphatic alcohols may be obtained by binding the sulfuric acid radicals at the double bonds of the corresponding unsaturated hydrocarbons. Also these sulfuric acid esters, the same as those described above and in the said application for patent, are readily soluble in water, and they are neither decomposed nor separated by the acid contained in the acid fulling liquors. They are well defined, pure, perfectly colorless bodies which are readily washed out after fulling without in any way changing the tint even of goods of very light colors.

I may proceed as follows: A piece of woolen fabric of 30 kilogrammes is fulled in the usual way with 45 liters of sulfuric acid of 2° Bé. together with 125 grammes of octodecyl sulfuric acid.

By the said addition the fulling process is considerably accelerated, the fulled goods are more open, and they have a more soft and full touch than goods treated by means of acid alone or in the presence of additions heretofore proposed.

Inasmuch as the new beneficial properties of the sulfuric derivatives herein described are due in a large part to the absence of any carboxyl groups it should be understood that the alcohols disclosed in the description and specified in the claims do not refer to, or include, any hydroxy carboxylic acids.

I claim:
1. The herein described process of manufacturing and treating liquor having high moistening and permeating properties, which consists in adding a sulphuric derivative of a higher molecular alcohol of the aliphatic series having a secondary alcohol radical and a primary alcohol radical to the treating liquor, thus improving the wetting, permeating, foaming or dispersing properties thereof.

2. The herein described moistening, permeating, foaming and dispersing medium, which consists of a treating liquor of high moistening and permeating properties having added thereto a sulphuric derivative of a higher molecular polyhydroxy alcohol of the aliphatic series and having a primary alcohol radical.

3. A treatment bath comprising an acid fulling liquor and a sulphuric derivative of a higher molecular alcohol of the aliphatic series.

4. A treatment bath comprising an acid fulling liquor and a sulphuric derivative of a higher molecular monohydroxy alcohol of the aliphatic series.

5. A treatment bath comprising an acid fulling liquor and a sulphuric derivative of a higher molecular polyhydroxy alcohol of the aliphatic series.

6. The process as described in claim 1 wherein the sulfuric derivative is employed in the form of a soluble salt.

7. The treating liquor as described in claim 2 wherein the sulfuric derivative is in the form of a soluble salt.

8. A treatment bath comprising an acid fulling liquor and a sulfuric derivative of dodecyl alcohol.

9. A treatment bath comprising an acid fulling liquor and a sulphuric derivative of octodecyl alcohol.

10. The hereindescribed process of manufacturing a treating liquor having high moistening and permeating properties, which consists in reducing a higher molecular hydroxyacid, sulfating the resulting dihydroxy alcohol, neutralizing and adding the resulting soluble salt to the treating liquor, thus improving the wetting, permeating, foaming or dispersing properties thereof.

11. A composition of matter for treating fibrous, pulverulent and water-repellent materials, and materials not readily soluble, comprising a sulphuric ester of an alcohol derived from a higher fatty or oily acid compound by replacement of the carboxylic group by the $CH_2OH$ group, in combination with an agent adapted for improving the properties of such materials, said composition having increased penetrating power over the agent when used alone.

12. In the process of enhancing the wetting, foaming or dispersion properties of an agent adapted for the treatment of fibrous, pulverulent and water-repellent material, and materials not readily soluble, the step comprising incorporating in said agent a sulphuric ester of an alcohol derived from a fatty acid or oily acid compound by replacement of the carboxylic group by a $CH_2OH$ group.

13. A composition of matter comprising, in combination, a treating agent for use in improving the properties of fibrous, pulverulent and water-repellent material, and materials not readily soluble, and a sulphuric ester of an alcohol derived from a fatty or oily acid by replacement of the carboxylic group by a $CH_2OH$ group.

14. A composition of matter comprising a treating agent dependent for its effectiveness to some extent upon its penetrating power into fibrous, pulverulent and water-repellent materials, or materials not readily soluble, in combination with a substance adapted to enhance the penetrating power consisting of a sulphuric ester of a higher primary fatty alcohol.

15. A process for increasing the penetrating and cleansing power of treating, cleaning or detergent agents comprising adding thereto a sulphuric ester of a higher primary fatty alcohol.

16. A composition of matter for treating fibrous, pulverulent and water-repellent materials, and materials not readily soluble, comprising a sulphuric ester of an alcohol derived from a higher fatty or oily acid compound by replacement of the carboxylic group by the $CH_2OH$ group, in combination with an aqueous treating agent, said composition having increased penetrating and detergent powers over the agent when used alone.

17. In the treatment of fibrous, pulverulent and water repellent material and materials not readily soluble with agents adapted to improve the properties of such materials having their effectiveness enhanced as heretofore practiced by the addition of Turkey red oils and the like, the improvement comprising employing such agents in the treatment of such materials together with sulfuric esters of higher fatty primary alcohols instead of with Turkey red oils or like compounds.

18. A treating bath having high moistening and permeating properties containing a treating agent and a sulfuric ester of a higher molecular fatty alcohol having at least one OH radical, said fatty alcohol having a primary OH radical.

19. A treating bath having high moistening and permeating properties containing a treatment agent and a sulfuric ester of a monohydroxy fatty alcohol having from 12 to 18, both inclusive, carbon atoms in the chain, said alcohol having a primary OH radical.

20. A treating bath having high moistening and permeating properties containing a treatment agent and a sulfuric ester of primary dodecyl alcohol.

21. A treating bath having high moistening and permeating properties containing a treatment agent and a sulfuric ester of primary octodecyl alcohol.

HEINRICH BERTSCH.